(12) United States Patent
Conti

(10) Patent No.: US 6,577,284 B1
(45) Date of Patent: Jun. 10, 2003

(54) COMPONENT FIELD ANTENNA FOR INDUCTION BOREHOLE LOGGING

(75) Inventor: Ugo Conti, El Cerrito, CA (US)

(73) Assignee: Electromagnetic Instruments, Inc., Richmond, CA (US)

(*) Notice: Subject to any disclaimer, the term of this patent is extended or adjusted under 35 U.S.C. 154(b) by 132 days.

(21) Appl. No.: 09/719,789
(22) PCT Filed: Nov. 6, 2000
(86) PCT No.: PCT/US00/30589
§ 371 (c)(1), (2), (4) Date: Dec. 15, 2000
(87) PCT Pub. No.: WO01/41319
PCT Pub. Date: Jun. 7, 2001

Related U.S. Application Data

(60) Provisional application No. 60/168,573, filed on Dec. 2, 1999.

(51) Int. Cl.⁷ ................................................. H01Q 7/08
(52) U.S. Cl. ........................ 343/788; 342/742; 342/867
(58) Field of Search .................................. 343/787, 788, 343/741, 742, 866, 867

(56) References Cited

U.S. PATENT DOCUMENTS

| | | | | |
|---|---|---|---|---|
| 2,399,382 A | * | 4/1946 | Polydoroff | 343/788 |
| 3,721,989 A | * | 3/1973 | Christensen | 343/788 |
| 4,319,191 A | | 3/1982 | Meador et al. | 324/341 |
| 4,360,777 A | | 11/1982 | Segesman | 324/339 |
| 4,373,163 A | * | 2/1983 | Vandebult | 343/842 |
| 4,458,248 A | * | 7/1984 | Lyasko | 343/788 |
| 4,538,109 A | | 8/1985 | Clark | 324/338 |
| 4,805,232 A | * | 2/1989 | Ma | 343/788 |
| 4,808,929 A | | 2/1989 | Oldigs | 324/339 |
| 4,839,624 A | * | 6/1989 | Schonstedt | 336/213 |
| 5,014,006 A | * | 5/1991 | Seitz | 324/249 |
| 5,115,198 A | | 5/1992 | Gianzero et al. | 324/339 |
| 5,307,081 A | * | 4/1994 | Harmuth | 343/788 |
| 5,757,191 A | | 5/1998 | Gianzero | 324/339 |
| 5,771,441 A | | 6/1998 | Altstatt | 455/166 |
| 5,976,287 A | | 11/1999 | Parsons et al. | 156/64 |
| 5,996,641 A | | 12/1999 | Chen | 455/41 |
| 6,181,138 B1 | | 1/2001 | Hagiwara et al. | 324/338 |

* cited by examiner

*Primary Examiner*—Hoang Nguyen
(74) *Attorney, Agent, or Firm*—Kevin P. McEnaney

(57) ABSTRACT

An antenna, and method for forming the same, is provided that receives or transmits three (3) components of low frequency magnetic fields while having physical dimensions that can be easily housed inside a slim borehole tool. The antenna includes a permeable core and a plurality of sets of windings of conductive wire surrounding the permeable core, with each set of plurality of sets having a cross-sectional area associated therewith, with the cross-sectionals of the remaining sets. Typically, the cross-sectional area of each of the plurality of cross-sectional areas extends orthogonally to the cross-sectional areas of the remaining cross-sectional areas of the plurality of cross-sectional areas.

27 Claims, 3 Drawing Sheets

COMPONENT FIELD ANTENNA FOR INDUCTION BOREHOLE LOGGING

This application claims the benefit of provisional application No. 60/168,573 filed Dec. 2, 1999.

FIELD OF THE INVENTION

The present invention relates to the field of geophysics. More particularly, the present invention pertains to an antenna suitable to measure the electrical characteristics of geologic formations.

BACKGROUND OF THE INVENTION

The resistivity of geological formations is routinely measured using wire line induction logging tools. The standard configuration is that of a multiturn loop of wire (solenoid), called the transistor, usually wrapped on a core of high permeability material (mu-metal or ferrite), oriented with the axis of solenoid parallel to the axis of the borehole (the z axis). If a current I is driven in the windings of the solenoid, a magnetic field is proposed whose field strength is roughly that of a magnetic dipole of moment Mz where the moment is the product of the number of turns (N), the current (I), the cross sectional area of the solenoid (A), and the effective permeability ($\mu$) of the magnetic material filling the core of cross sectional A. The effective $\mu$ depends on the true $\mu$ of the material and in a complex way on the length to diameter ratio of the core of the solenoid. Long thin cores typically have the highest effective $\mu$.

The same solenoid may be used as a detector or receiver of a time varying magnetic field. Now the changing magnetic field along the axis of the solenoid produces an emf in the windings which is proportional to the time rate of change of the magnetic induction, B, the number of turns N, the cross sectional A, and again the effective $\mu$ (which in this case increases the flux threading the windings).

Most current induction tools use such transmitters and receivers spaced apart within a borehole. The principles of operation are well known. The transmitter is driven with an alternating current thus producing an alternating magnetic field in the formation proximate to the transmitter. This magnetic field produces an emf in the formation by virtue of Faraday's law. The emf drives a current which is inversely proportional to the resistivity of the formation. Finally this current produces a magnetic field, called the secondary field that is also inversely proportional to the resistivity. Both the primary and secondary magnetic fields are detected by the receiver. Thus, measurements of the secondary magnetic field at a receiver are dependent on the resistivity of the formation.

In a uniformly horizontally layered medium the induced currents from such a vertical solenoid lie in the horizontal plane and are sensitive to the resistivity parallel to the bedding planes (the longitudinal resistivity, pl). However most geologic formations of interest are an inhomogeneous medium.

What is needed, therefore, is an antenna capable of detecting magnetic fields in an inhomogeneous medium while having physical dimensions suitable for use in a slim borehole tool.

SUMMARY OF THE INVENTION

An antenna, and method for forming the same, is provided that is suitable for receiving or transmitting three (3) components of low frequency magnetic fields while having physical dimensions that can be easily housed inside a slim borehole tool. The antenna includes a permeable core and a plurality of sets of windings of conductive wire surrounding said permeable core, with each set of said plurality of sets having a cross-sectional area associated therewith, with the cross-sectional area of one of said plurality of sets orientated transversely to the cross-sectional areas of the remaining sets. Typically, the cross-sectional area of each of the plurality of cross-sectional areas extend orthogonally to the cross-sectional areas of the remaining cross-sectional areas of the plurality of cross-sectional areas.

The core may be formed either from ferrite, mu-metal or any other suitable material and may have a cylindrical shape or a cubical shape. Typically, the core has a shape that maximizes that amount of material that may be placed in a unit volume. One example of the core includes a plurality of permeable cylindrical rods, while another example includes a plurality of permeable strips. Additionally, an electrostatic shield, consisting of two overlapping helical strips of conductive tape, may be wrapped around the conductive wires. In this manner, electric charges from the windings may be reduced by connecting the conductive tape to the ground.

BRIEF DESCRIPTION OF THE DRAWINGS

The present invention may be better understood, and its numerous objects, features, and advantages made apparent to those skilled in the art by referencing the accompanying drawings.

DESCRIPTION OF THE PREFERRED EMBODIMENT

Figure 1:
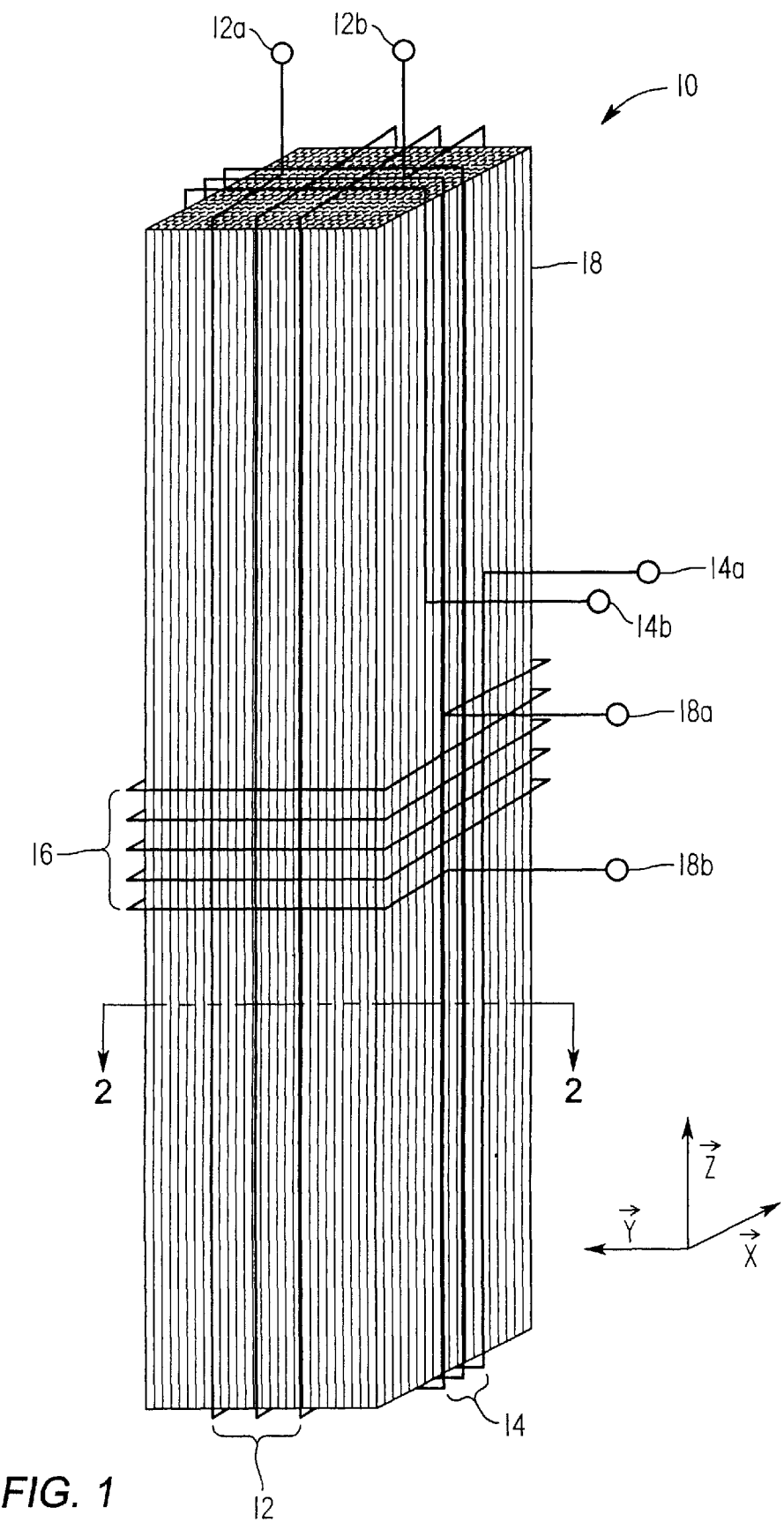
FIG. 1 is a perspective view of an antenna in accordance with the present invention.

Referring to FIG. 1, an antenna 10, in accordance with the present invention, includes three (3) sets of windings 12, 14, and 16 of conductive wire wound around a high permeability core 18. Each set of windings 12, 14, and 16 has a cross-sectional area associated therewith, defining three cross-sectional areas. Specifically, the cross-sectional area associated with windings 12 lies in the y-z plane, and the cross-sectional area associated with windings 14 lies in the z-x plane. The cross-sectional area associated with windings 16 lies in the x-y plane. One of the aforementioned cross-sectional areas is oriented transversely with respect to the two remaining cross-sectional areas. As shown, the cross-sectional areas each lie in a plane that is orientated orthogonally to the planes in which the two remaining cross-sectional areas lie.

Figure 2:
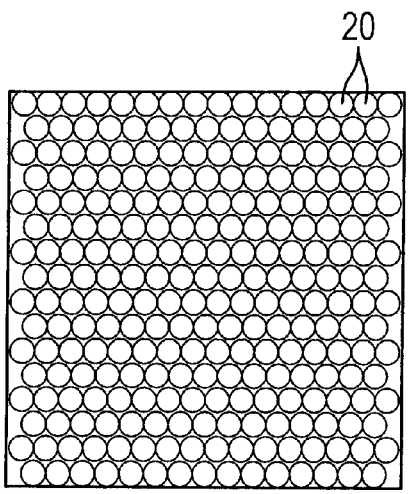
FIG. 2 is a cross-sectional view of the antenna shown in FIG. 1 taken along lines 2—2.
Figure 3:
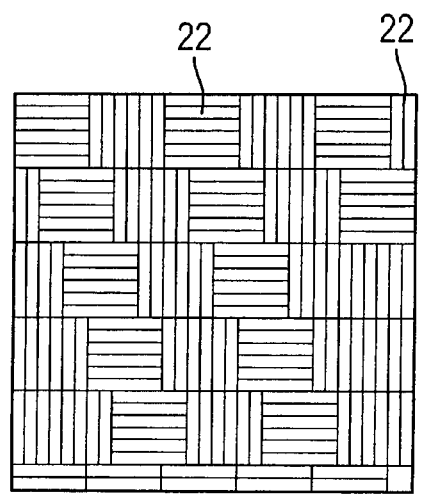
FIG. 3 is a cross-sectional view of the antenna shown in FIG. 1 in accordance with a first alternate.
Figure 4:
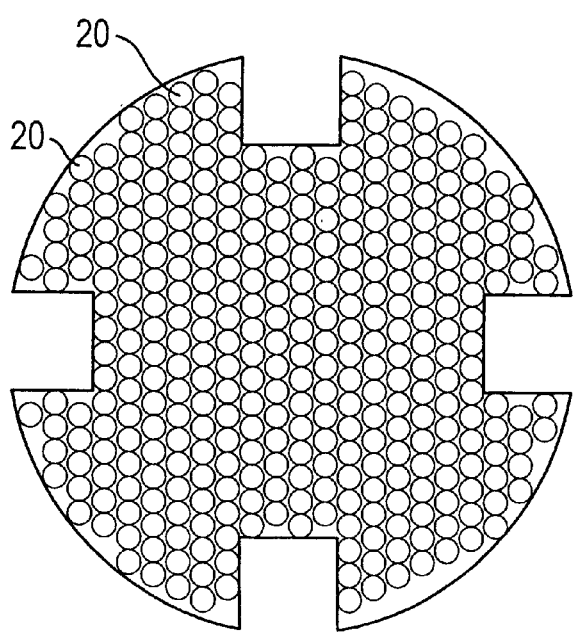
FIG. 4 is a cross-section view of the antenna shown in FIG. 1 in accordance with a second alternate embodiment.
Figure 5:
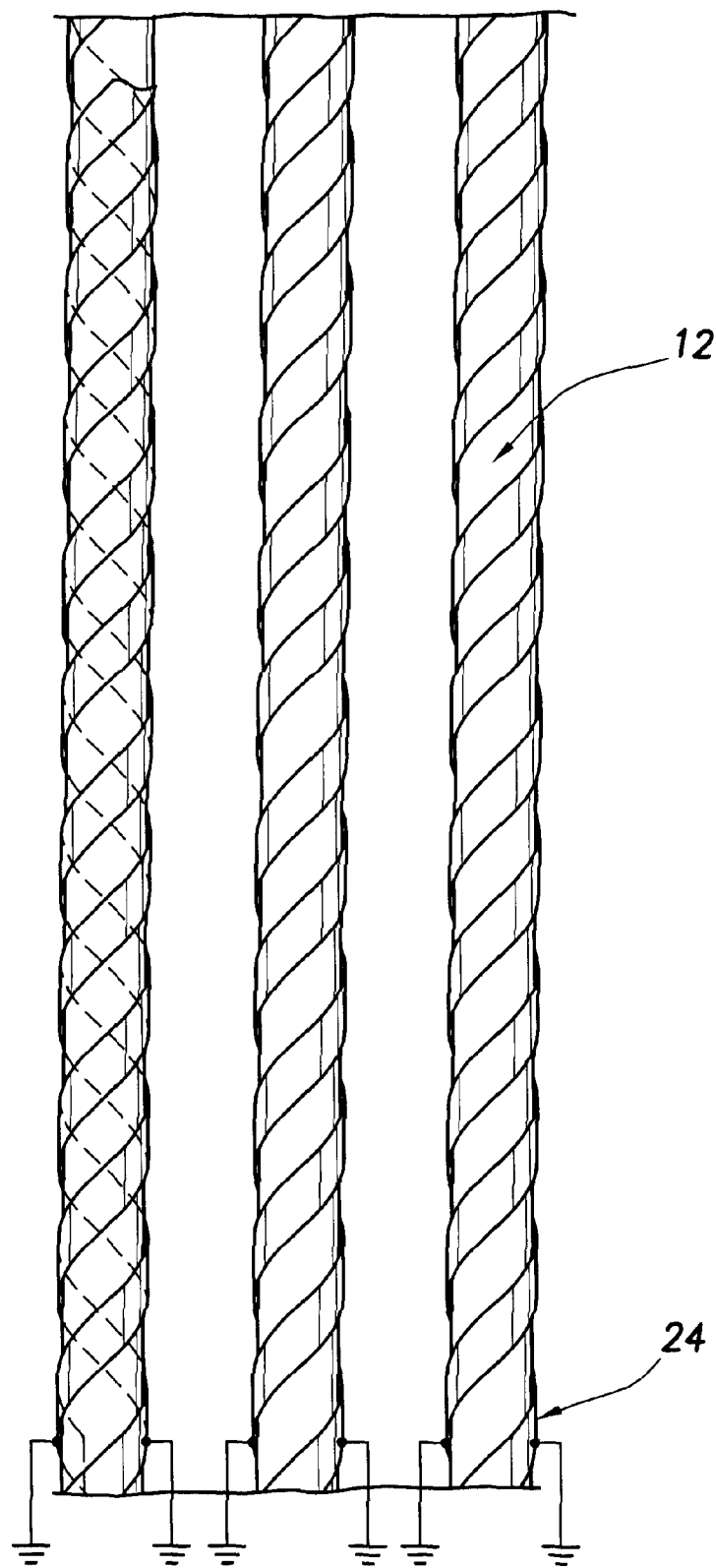
FIG. 5 is an enlarged view of the windings of FIG. 1.

The core 18 may have the shape of an elongated cylinder or cube with a cross section that maximizes coupling between the sets of windings 12, 14, and 16 with the magnetic field. The core 18 may be formed from any suitable material such as ferrite, mu-metal and the like. It is desired, however, that the material from which the core 18 is fabricated be from mumetal suitable for high temperature applications. To that end, the mu-metal core 18 would include a bundle of small diameter permeable rods 20, shown in FIGS. 2 and 4, or thin, narrow strips of permeable material 22, shown more clearly in FIG. 3. The structures limit dissipation due to eddy currents generated by the three (3) components of a magnetic field. However, the core 18, shown in FIG. 1, can be a simple cube of a more complex shape to maximize the amount of permeable material that may fit is a given unit of volume. This facilitates maximization of the permeable material that may fit within the available space inside a borehole tool.

The antenna may be employed in a borehole logging system at both the transmitter and the receiver, because it provides multiple orientations of a transmitter dipole and facilitates measurements of multiple components of a magnetic field. To that end, the windings 12 include input/output nodes 12a and 12b. The windings 14 include input/output nodes 14a and 14b, and the windings 18 include input/output nodes 18a and 18b. The logging system is connected to the input/output nodes, 12a, 12b, 14a, 14b, 18a and 18b, and includes capabilities to accurately measure the electrical characteristics of inhomogeneous media, such as geologic formations, where the resistivity across the bedding planes (known as the transverse resistivity, pt) is typically different from that parallel to the bedding planes. When employed at the receiver, each of the windings on the antenna 10 are typically shielded from the remaining windings on the antenna 10, as well as from the environment. The aforementioned shielding is achieved by wrapping each winding with two overlapping helixes 24 of conductive tape. Although electrostatic shield 24 is shown only windings 12 for clarity sake, it should be understood that windings 14 and 16 are also wrapped in a similar manner. The helixes are open on both ends and are connected to system ground to bleed electrical charges from the windings 12, 14, and 16.

Although the foregoing antenna 10 has been discussed with respect to borehole logging, it should be understood that the antenna may be employed in any transceiver system. The scope of the invention should, therefore, be determined not with reference to the above description, but instead should be determined with reference to the appended claims along with their full scope of equivalents.

What is claimed is:

1. An antenna comprising:
   a permeable core;
   a plurality of sets of windings of conductive wire surrounding said permeable core, with each set of said plurality of sets having a cross-sectional area associated therewith, with the cross-sectional area of one of said pluralily of sets oriented transversely to the cross-sectional areas of the remaining sets; and
   a plurality of electrostatic shields separately surrounding said conductive wire of each of said plurality of sets of windings.

2. The antenna as recited in claim 1 wherein said core is formed from ferrite.

3. The antenna as recited in claim 1 wherein said core is formed from mu-metal.

4. The antenna as recited in claim 1 wherein said core has a cylindrical shape.

5. The antenna as recited in claim 1 wherein said core has a cubical shape.

6. The antenna as recited in claim 1 wherein the cross-sectional area of each of said plurality of sets orientated orthogonally to the cross-sectional areas of the remaining sets.

7. The antenna as recited in claim 1 wherein said core includes a plurality of conductive cylindrical rods.

8. The antenna as recited in claim 1 wherein said core includes a plurality of permeable strips.

9. The antenna of claim 1, wherein the electrostatic shield comprises two strips of conductive tape wrapped in an overlapping helix configuration around the conductive wires.

10. An antenna comprising:
    a permeable core;
    a plurality of sets of windings of conductive wire surrounding said permeable core, with each set of said plurality of sets having a cross-sectional area associated therewith, with the cross-sectional area of one of said plurality of sets oriented orthogonally to the cross-sectional areas of the remaining sets; and
    a plurality of electrostatic shield separately surrounding said conductive wire of each of said plurality of sets of windings.

11. The antenna as recited in claim 10 wherein said core is formed from ferrite.

12. The antenna as recited in claim 11 wherein said core includes a plurality of permeable cylindrical rods.

13. The antenna as recited in claim 11 wherein said core includes a plurality of permeable strips.

14. The antenna as recited in claim 10 wherein said core is formed from mu-metal.

15. The antenna as recited in claim 14 wherein said core includes a plurality of permeable cylindrical rods.

16. The antenna as recited in claim 14 wherein said core includes a plurality of permeable strips.

17. The antenna of claim 10, wherein the electrostatic shield comprises two strips of conductive tape wrapped in an overlapping helix configuration around the conductive wires.

18. An antenna comprising:
    a permeable core;
    a plurality of sets of windings of conductive wire surrounding said permeable core, with each set of said plurality of sets having a cross-sectional area associated therewith, with the cross-sectional area of one of said plurality of sets oriented transversely to the cross-sectional areas of the remaining sets; and a plurality of electrostatic shields separately surrounding said conductive wire of each said plurality of sets of windings.

19. The antenna as recited in claim 18 wherein said core is formed from ferrite.

20. The antenna as recited in claim 19 wherein said core includes a plurality of permeable cylindrical rods.

21. The antenna as recited in claim 19 wherein said core includes a plurality of permeable strips.

22. The antenna as recited in claim 18 herein said core is formed from mu-metal.

23. The antenna as recited in claim 22 herein said core includes a plurality of permeable cylindrical rods.

24. The antenna as recited in claim 22 wherein said core includes a plurality of permeable strips.

25. The antenna of claim 18, wherein the electrostatic shield comprises two strips of conductive tape wrapped in an overlapping helix configuration around the conductive wires.

26. A method for forming an antenna having a permeable core, said method comprising:
    winding a first plurality of conductive wires about said permeable core;
    winding a second plurality of conductive wires about said permeable core;

winding a second plurality of conductive wires about said permeable core, with each set of said first, second and third plurality of conductive wires having a cross-sectional area associated therewith, defining a plurality of cross-sectional areas, with the cross-sectional area of each said plurality of cross-sectioinal areas being oriented transversely to the cross-sectional areas of the remaining cross-sectional areas of said pluralily of cross-sectional areas; and wrapping a plurality of electrostatic shields separately surrounding said conductive wire of each of said first, second and third plurality of conductive wires.

27. The method of claim 26, wherein the elecltostatic shield comprises two strips of conductive tape wrapped in an overlapping helix configuration around the conductive wires.

* * * * *